US012792739B2

(12) United States Patent
Shetty et al.

(10) Patent No.: US 12,792,739 B2
(45) Date of Patent: Nov. 10, 2026

(54) SECURE PEER-TO-PEER FILE DISTRIBUTION IN AN ENTERPRISE ENVIRONMENT

(71) Applicant: Omnissa, LLC, Mountain View, CA (US)

(72) Inventors: Rohit Pradeep Shetty, Bangalore (IN); Richard Jason Croft, Sydney (AU); Erich Stuntebeck, Johns Creek, GA (US)

(73) Assignee: Omnissa, LLC, Mountain View, CA (US)

( * ) Notice: Subject to any disclaimer, the term of this patent is extended or adjusted under 35 U.S.C. 154(b) by 758 days.

(21) Appl. No.: 18/050,120

(22) Filed: Oct. 27, 2022

(65) Prior Publication Data

US 2024/0143779 A1 May 2, 2024

(51) Int. Cl.
*G06F 21/57* (2013.01)
*G06F 21/54* (2013.01)

(52) U.S. Cl.
CPC ............ *G06F 21/577* (2013.01); *G06F 21/54* (2013.01)

(58) Field of Classification Search
CPC ...... G06F 21/577; G06F 21/54; H04W 12/63; G06Q 20/123; H04L 67/1074; H04L 63/1416; H04L 67/104; H04L 63/168; H04L 63/0815
See application file for complete search history.

(56) References Cited

U.S. PATENT DOCUMENTS 8,627,463 B1 * 1/2014 Glick .................. H04L 63/1416 707/622
8,738,778 B2 * 5/2014 Cohen ................... H04L 67/104 709/227
8,924,460 B2 * 12/2014 Collet ................... H04L 67/104 709/204
10,530,813 B2 * 1/2020 Quintas ................... H04L 63/20
11,522,925 B2 * 12/2022 Morris .................... H04S 3/008
2005/0086300 A1 * 4/2005 Yeager .................. H04L 69/329 709/204
2010/0121955 A1 * 5/2010 Doganaksoy ........... H04L 43/16 709/226
2010/0161752 A1 * 6/2010 Collet ................... H04L 67/104 709/216
2011/0071841 A1 * 3/2011 Fomenko ................ H04L 63/10 705/1.1
2012/0155643 A1 * 6/2012 Hassan ................. H04L 63/065 380/270

(Continued)

FOREIGN PATENT DOCUMENTS

CN 107004090 * 8/2017 ......... H04L 63/1408

OTHER PUBLICATIONS

Bhagat et al "Content-based file sharing in peer-to-peer networks using threshold", Procedia Computer Science, vol. 79, 2016, pp. 53-60 (Year: 2016).*

*Primary Examiner* — Catherine Thiaw
(74) *Attorney, Agent, or Firm* — Kim & Stewart LLP

(57) ABSTRACT

A secure peer-to-peer (p2p) file distribution system is disclosed herein. A security posture for devices can be ascertained. A file risk for the file being distributed can also be ascertained. Distribution of the file in a p2p system can be performed based upon the file risk and the security posture of the respective devices to which the file is being transmitted.

18 Claims, 6 Drawing Sheets

(56) References Cited

U.S. PATENT DOCUMENTS

| | | | | |
|---|---|---|---|---|
| 2017/0163605 | A1* | 6/2017 | Martin-Bale | H04L 67/125 |
| 2020/0382543 | A1* | 12/2020 | Hoopes | H04L 63/168 |
| 2021/0258774 | A1* | 8/2021 | Ramsay, III | H04W 12/63 |
| 2022/0060498 | A1* | 2/2022 | Head, Jr. | H04L 12/4641 |
| 2022/0109562 | A1* | 4/2022 | Feola | G06Q 20/123 |
| 2023/0030990 | A1* | 2/2023 | Shenoy | H04L 67/1074 |
| 2023/0401321 | A1* | 12/2023 | Moshe | G06F 16/1837 |
| 2024/0022547 | A1* | 1/2024 | Crabtree | H04L 63/0815 |
| 2024/0250958 | A1* | 7/2024 | Roy | H04L 63/14 |

* cited by examiner

SECURE PEER-TO-PEER FILE DISTRIBUTION IN AN ENTERPRISE ENVIRONMENT

BACKGROUND

Information technology (IT) administrators can be tasked with managing a fleet of devices that are enrolled as managed devices with a remotely executed management service. While managing these devices, the IT administrator might need to push files to the managed devices. These files can include operating system updates or patches, applications, application updates, and even documents and other content files that are not executable files. Peer-to-peer (p2p) file sharing protocols can be used to distribute or share files while reducing the computational and network load on a single host of the file. However, p2p protocols typically do not account for the security risk associated with a file or the security posture of a device participating in the distribution of a file when determine whether a device is a seed or a peer device.

BRIEF DESCRIPTION OF THE DRAWINGS

Various aspects of the present disclosure can be better understood with reference to the following drawings. The components in the drawings are not necessarily to scale. Emphasis is placed upon clearly illustrating various features of the present disclosure. Moreover, in the drawings, like reference numerals designate corresponding parts throughout the several views.

DETAILED DESCRIPTION

Figure 1:
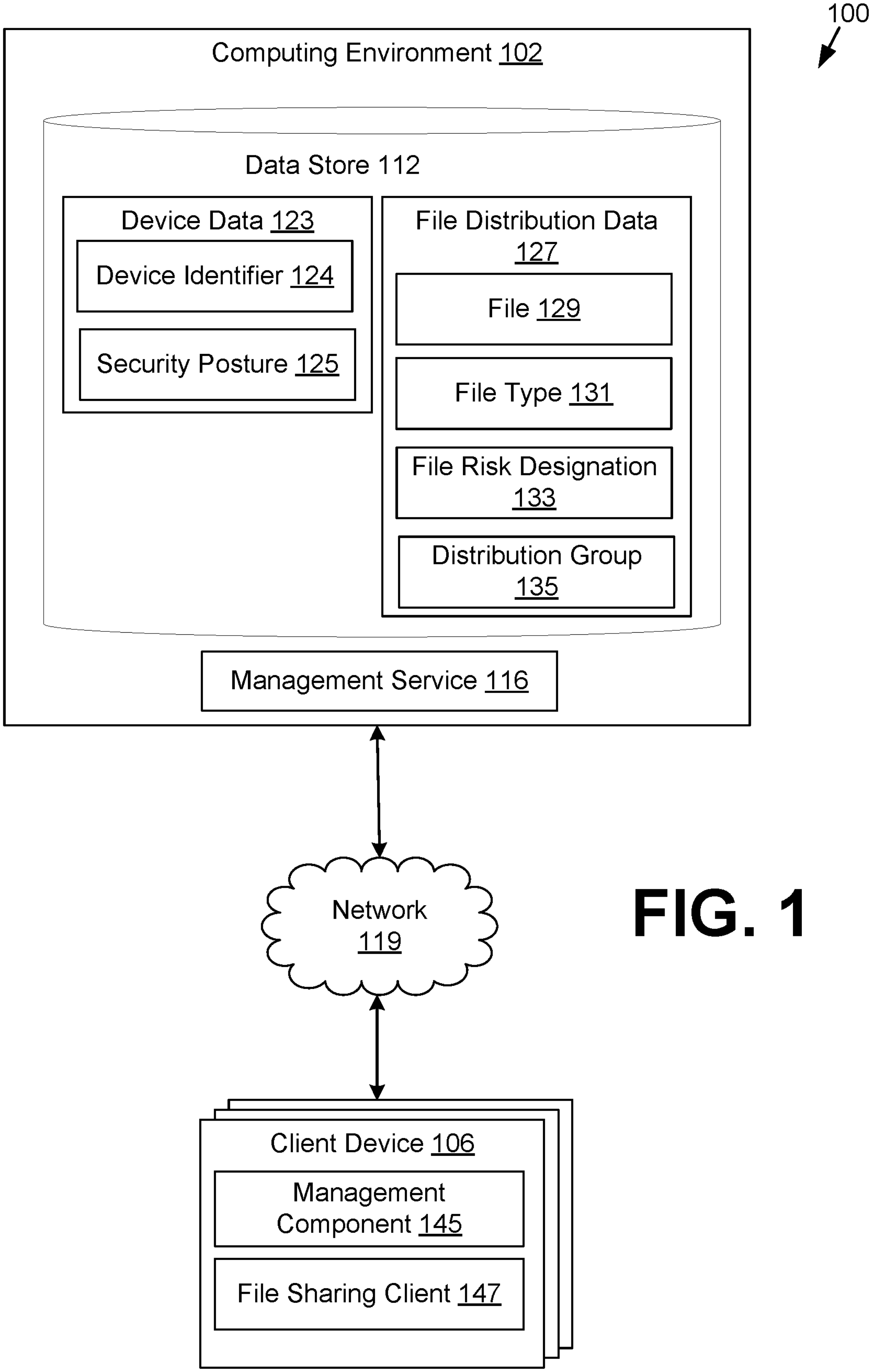
FIG. 1 is a block diagram of a networked environment according to examples of the disclosure.

Users in an enterprise environment can be granted access by information technology (IT) administrators to enterprise resources, such as mail, files, and other resources. Users can utilize their own devices or devices issued by the enterprise to access company resources. Administrators might require that enterprise issued devices or devices brought by the user be enrolled as managed devices with a management service.

A management service can be run on a server or group of servers that are remote from the users' devices. The management service can allow administrators to manage users' devices to a certain degree. The management service, working in conjunction with a management component running on the users' devices, can install applications, profiles, settings, and make changes and adjustments to the user's devices. To accomplish management of user devices, the management service can distribute files to devices that are managed by the management service.

These files can include apps, operating system (O/S) upgrades, patches, file, documents or other content. In some environments, peer-to-peer (p2p) file sharing systems or protocols can be used to distribute files to reduce the load on file servers or content delivery networks (CDNs) in use by the enterprise. However, the existing P2P systems often fail to consider the sensitivity of a file that is being distributed. For example, an O/S security patch carries a considerably high risk such that the enterprise wants to avoid a malicious actor from distributing a faked patch that is installed on user devices. As another example, a document or video may carry a lower risk because the risk to a device receiving the content is lower than an executable or installable file. However, certain documents may contain highly sensitive enterprise information and can be associated with a higher risk level than other documents, which is not accounting for by existing p2p systems, which typically only consider factors such as bandwidth and the availability of nodes to serve as peers or seeders.

With the proliferation of malware and web-based exploits, additional factors can be considered. Examples of this disclosure can consider the security posture of a peer or seeder in a p2p system. As an example scenario, a compromised device acting as a seeder or root peer can be deleterious repercussions. A compromised peer obtaining confidential files from a secure root peer could have repercussions including leakage of confidential data.

Examples of this disclosure can also consider the risk level associated with a file that is being distributed. For example, the consequences associated with a compromised O/S update or executable file might be larger that of a simple whiteboarding app that does not request administrative privileges on a device on which it is being installed. For files at higher risk, only highly secure clients should be elected as peers in the P2P system.

Additionally, for files that are particularly large, the device selected as the root peer might have changes in its status over time (e.g., network bandwidth conditions, device location, device network location). In these cases, if the device continues as the root peer, the security posture of the device can change over time.

Accordingly, examples of the disclosure can take into account the security posture of a device acting as a seeder or peer in a p2p system as well as the sensitivity of a file that is being distributed. These risks can be analyzed to select seeders and peers within a p2p system. The seeder criteria can include the security posture of a device as well as the bandwidth availability, network connection speed, CPU utilization, device resources. In some cases, a device might be excluded from the p2p system that required to obtain the file directly from a file server or content delivery network. In other cases, the device might be excluded from receiving the file at all.

FIG. 1 depicts a networked environment 100 that includes a computing environment 102 and one or more client devices 106, which can be in communication over a network 119. The client devices 106 can be devices to which the computing environment 102 sends push notifications, such as devices that are managed by a management service 116 running on the computing environment 102. The network 119 can include, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

The computing environment 102 can comprise, for example, a server computer or any other system providing computing capability. Alternatively, the computing environment 102 can employ a plurality of computing devices that can be arranged in one or more server banks, computer banks or other arrangements. The computing devices can be in a single installation or can be distributed among different geographical locations. For example, the computing environment 102 can include a plurality of computing devices that can collectively comprise a hosted computing resource, a grid computing resource and/or any other distributed computing arrangement. In some cases, the computing environment 102 can correspond to an elastic computing resource where the allotted capacity of processing, network, storage, or other computing-related resources can vary over time. The computing environment 102 can also include or correspond to one or more virtualized server instances that are created to execute the functionality that is described herein.

Various applications or other functionality can be executed in the computing environment 102. Also, various data can be stored in a data store 112 that can be accessible to the computing environment 102. The data store 112 can be representative of a plurality of data stores 112. The data stored in the data store 112 can be associated with the operation of the various applications or functional entities described below.

The components executed on the computing environment 102 can include a management service 116 and other applications, services, processes, systems, engines, or functionality not discussed in detail herein. The management service 116 can monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116.

The management service 116 can distribute files to a client device 106 that is managed by the management service 116. For example, O/S patches or updates, executable files such as applications or application installers, documents, audio, video, or other content can be distributed by the management service 116 to managed devices. In one example, the management service 116 can distribute files using a p2p protocol that relies a p2p client running on the managed device that facilitates peer-to-peer distribution of files. The management service 116 can provide a file to one or more seeder nodes that are selected by the management service 116, which can in turn distribute the file to peer nodes. In some cases, depending upon the p2p protocol utilized, the peer nodes can further redistribute the file to other peer nodes in the grouping of devices that is selected to receive a particular file.

The management service 116 can include a management console that can allow administrators to manage client devices 106 that are enrolled with the management service 116. User interfaces can allow an administrator to define policies for a user account or devices associated with an enterprise environment. The user interfaces can also include, for example, presentations of statistics or other information regarding the client devices 106 that can be managed by the management service 116. In one example, the management console can allow an administrator to upload or select a file for distribution to a population of devices. The population of devices can be selected by selecting a particular user group or device group within a directory service.

The management console can also allow the administrator to select a risk level associated with the file. The risk level can be one of a plurality of risk levels, such as high-risk, medium-risk, low-risk, etc. Risk level can also be selected based upon a numerical risk scale, such as 1-5, 1-10, etc. The administrator can select a risk level associated with a file along with uploading or selecting the file for distribution to a population of managed devices. The administrator can also select a grouping of managed devices that should receive a selected file using the management console. The grouping of devices can be selected by selecting a particular, user group, organizational group, or other grouping of devices or users. The grouping of devices can be selected from among a population of managed devices that are managed by the management service 116. In some implementations, the management console can allow an administrator to select one or more managed devices as seeder nodes.

The data stored in the data store 112 can include device data 123, file distribution data 127, and potentially other data. Device data 123 can include records corresponding to client devices 106 that are enrolled as managed devices with the management service 116. A record within device data 123 can include various security settings selected for enforcement on a client device 106 that is enrolled with the management service 116. Accordingly, a device record can include a device identifier associated 124 with a device, such as the client device 106, a security posture 125, and potentially other data not shown. In some examples, device data 123 can also identify a user associated with a client device 106. A device record can also store other device specific information, such as a device type, operating system type or version, applications that are required or optional for the device, or an enrollment status of the device. In this scenario, the device data 123 can also indicate whether a managed device is a computing device or a peripheral device, such as a printer, scanner, or other device that can be deployed in an environment and associated with a record in a directory service.

Various compliance rules can be enforced on client devices 106 that are enrolled as managed devices with the management service 116. For example, a compliance rule can specify that a client device 106 is required to be off or in a low power “sleep” state during a specified time period. Another compliance rule can specify that a client device 106 is required to be on or in a normal operation “awake” state during a specified time period. As another example, a compliance rule can specify that a client device 106 is prohibited from rendering content that has been designated as confidential.

File distribution data 127 can include one or more tables or other data structures that track information about files that are distributed to devices using a p2p system according to examples of the disclosure. File distribution data 127 can include the file 129, a file type 131, a file risk designation 133, and a distribution group 135 corresponding to the file 129.

The file 129 can be a copy of or a reference to a file distributed by the management service 116 to managed devices. The reference can be a URL or other identifier or pointer corresponding to the file 129. The file type 131 can specify a type or file extension corresponding to the file. The file type 131 can be automatically detected by the management service 116 when a file 129 is provided to the management service 116 or specified by an administrator using a management console provided by the management service 116.

A file risk designation 133 can express a risk level associated with a file. The risk level can be one of a plurality of risk levels, such as high-risk, medium-risk, low-risk, etc. Risk level can also be selected based upon a numerical risk scale, such as 1-5, 1-10, etc. The administrator can select a risk level associated with a file along with uploading or selecting the file for distribution to a population of managed devices.

A distribution group 135 can identify one or more client device 106 to which a particular file 129 is being distributed using the p2p system implemented by the management service 116 and the respective client devices 106. The distribution group 135 can identify which of the managed devices in a population of devices are the root peers or the seeders of the file. The distribution group 135 can identify devices by a group identifier or by individual device identifiers 134 of the devices to which the file 129 is distributed.

The client device 106 can be a processor-based system such as a desktop computer, a laptop computer, a smartphone, a tablet computer system, and so on. The client device 106 includes a display that comprises, for example, one or more devices such as liquid crystal display (LCD) displays or other types of display devices. The client device 106 is equipped with networking capability or networking interfaces, including a localized networking or communication capability, thereby allowing the client device 106 to communicate with the computing environment 102 over the network 119.

The client device 106 executes various applications, such as a management component 145. The management component 145 can communicate with the management service 116 and manage the client device 106 on behalf of the management service 116. The management component 145 can provide visibility with respect to the operation status of the client device 106 and can be installed with elevated privileges on the client device 106 to facilitate management of the device. The client device 106 can be provisioned by the management service 116 by causing resources to be installed or stored on the client device 106 using the command queue maintained by the management service 116. The management service 116 can therefore permit or deny various services to the client device 106.

Once a client device 106 has been remotely provisioned and enrolled by the IT administrator, the activities of the client device 106 can be tracked by the management service 116. Compliance rules can also be stored on the client device 106, where the management component 145 reports any violations of compliance rules to the computing environment 102. The management component 145 can also receive commands from the management service 116 through the distributed notifications framework to install applications, profiles or other data on the device or carry out any other management commands on the device.

The management component 145 can also report the current status of the client device 106 to the management service 116, which can determine a security posture 125 of the client device 106 based upon the status. For example, the management component 145 can report the device posture, which can include information like the anti-virus client status on the client device 106, a O/S version or patch status, a network or VPN through which the client device 106 is communicating with the network 119, a location of the client device 106, and other status information that can be determined regarding the client device 106. The various status information can be utilized to determine whether a client device 106 is considered secure or whether it is compromised. The management component 145 can receive requests to retrieve a file from the management service 116 or from another client device 106 utilizing a p2p system or protocol.

The client device 106 can also execute a file sharing client 147. The file sharing client 147 can implement a p2p protocol to receive and/or distribute a file provided by the management service 116. The file sharing client 147 can communicate with the management service 116 to determine whether a client device 106 on which the file sharing client 147 is executing is a peer or a seeder for a particular file 129.

In examples of the disclosure, the file sharing client 147 running on a client device 106 intended to receive a particular file in conjunction with the management service 116 to perform download of files and redistribution of files to other client devices 106 in a grouping of devices intended to receive the file. When an administrator assigns files to a group in the management service 116 console, the details can be sent to the management component 145 on the devices which then hands over the details to the management component 145 on the device which handles the downloading and informs the completion status to the management component 145.

Examples of the disclosure can introduce a layer of security between the management service 116 and the p2p protocol utilized to distribute files to client devices 106. Peers in a p2p system can be selected based on various parameters. The various parameters that are used to select peers (single or multiple) can include a security posture of the peer in examples of the disclosure. Hashing can be utilized to verify file integrity by the file sharing client 147, but examples of the disclosure can also prevent vulnerability that exists with systems that only perform hashing.

For example, consider the case where p2p clients (or their communications) are compromised using exploits at an O/S or network level. In this case, a compromised client device 106 can potentially act as a root peer for other clients. If the peer on the other side or its network is compromised, then verifying hashing could be overcome. In examples of the disclosure, the chances of a compromised client becoming a root seed node is reduced be the management service 116 can select seeder nodes based on security posture. In the case of a Trojan or a virus transmission using a p2p protocol, examples of the disclosure can operate as s circuit breaker such that a compromised device can never become a seed node. This capability exists because the security posture of a client device 106, as determined by data reported to the management service 116 by the file sharing client 147, the security posture of a user and the security posture of a network connection of the client device 106 can be parameters in electing the root peer.

Consider a large O/S or security update file a large file size. If a seed node or communication from the seed node is somehow compromised, there might be a large amount of data downloaded on each client device 106 before the hash verification check is done. In large organizations, where a single update is to be pushed to thousands of devices, if a compromise is detected only after several chunks of the file have been downloaded on each of the clients, then it could have a detrimental effect on the network load. If a high volume of seeder nodes are compromised, this scenario can easily be used to overwhelm internal networks by generating additional traffic and creating an artificial congestion. This could even emerge as a throttling attack on enterprise networks by controlling a percentage of p2p clients.

Additionally, examples of disclosure can prevent various scenarios emerging when a receiving peer is itself malicious. This is particularly dangerous even in scenarios where the root peer performing the seeding is secure. In these cases, a malicious receiving peer could receive highly secure files from a secure root peer. This could have several ramifications including exposing confidential data to bad actors. Additionally, a malicious client can potentially modify, corrupt, and re-transfer the file via the p2p system utilized by the client devices 106 that are peers receiving the file.

Therefore, examples of the disclosure can implement a zero trust p2p framework that can utilized by the management service 116 and managed devices to distribute a file 129. Attributes like the device posture, user posture (e.g. password/MFA status, location) and the associated risk scores can play an important role in deciding whether a peer is considered secure. Since all these metrics can be evaluated continuously at runtime by the file sharing client 147 and/or the management service 116, the risk levels associated with a peer can dynamically change, which can also change the designation of a client device 106 as a root peer. Thus, each device serving as a peer can be continuously evaluated, and the status of a client device 106 as a peer or seeder can dynamically change depending upon the security posture 125 of the device at any given time.

Any change in the security posture 125 of a device can potentially result in a corresponding change in its designation as a root peer or seeder. Any change in the device attributes (e.g., IP address, location, public Wi-Fi) or any change in the user attributes can lead to automatic reclassification of the security posture 125 by the management service 116. The updated security posture 125 of the device can result in the management service 116 ceasing transfer of a file 129 to or from a particular client device 106, which can instruct the 147 to cease any secure file transfer to or from a device whose security posture 125 has been downgraded below a level that is acceptable for the file 129 that is being transferred. Also, any confidential content already downloaded onto the device can be deleted by the file sharing client 147 based on the security posture 125 of the device and the file risk designation 133 of the confidential content. Thus, examples of the disclosure can provide a mechanism of continuous evaluation and re-rating of devices participating in the p2p system.

For example, there might be cases of long running downloads where a client device 106 might be designated as root or seeder at the start of the download. However, after a certain point of time, the security posture 125 of the client device 106 changes from Low risk to Medium Risk. This change could occur due to changes in network, location, or applications installed on the client device 106. The management component 145 can report the change in conditions to the management service 116. The management component 145 or the management service 116 can determine the security posture 125 of the client device 106 or the file risk designation 133 of the file 129 file being shared—this peer could automatically be removed as a seeder if the security posture 125 drops below a threshold level. For example, if the security posture 125 of the device drops from a most secure level, the client device 106 can be removed as a seeder for a file 129 having the highest file risk designation 133. As another example, if the security posture 125 of the device drops from a most secure level to a medium secure level, the client device 106 might still be allowed to operate as a seeder for a file 129 with a medium file risk designation 133.

Client peers that are not seeders can also be continuously evaluated and classified based on their security posture 125. In some cases, if the security posture 125 of a peer drops below a highest security level, the client device 106 might be removed from the p2p system and be required to obtain the file 129 directly from the management service 116 or a content delivery network. In other words, the client device 106 can be excluded from the p2p system. Accordingly, files can be shared with client devices 106 in accordance with their security posture 125. For example, a file containing highly confidential company data will not be seeded into a client device which is not classified as Highly Secure. This can prevent leakage of classified information and also prevents an insecure client device from positioning itself as a root device in the future.

In both the above cases, since the security posture 125 can be continuously evaluated by the management component 145 or management service 116, any change in the security posture of the device can result in an automatic re-rating of the device. For example, a device might be rated as Moderately secure due to the network to which it is currently connected to or due to an O/S patch not being installed. This might prevent Highly Confidential data from being shared with client device 106 or even prevent this device from acting as a root peer in some circumstances. However, any change in the network connected or installation of the OS patch can cause an automatic re-rating of this device, allowing to function both as a client or a root peer based on its new and updated security posture 125. The security posture 125 of a client device 106 can be determined by the management component 145 or by the management service 116 based upon information obtained about or from the client device 106 about its current status.

Examples of the disclosure can further classify content and devices into security/risk categories and utilize the same for performing any file downloads via a p2p protocol. Files 129 can be assigned by the administrator to a grouping of devices and given a file risk designation 133 either automatically (e.g., based on file type 131, recent attacks seen on similar file type, an examination of the content of the file.) or by the administrator, who manually assigns the file 129 a file risk designation 133. As another example of an automated file risk designation 133, the management service 116 can determine that all executable files or O/S updates/patches are considered at "High Risk" by default.

Devices which are part of the grouping can also be classified into one of the same risk classifications based upon the respective security posture 125 of the devices. Accordingly, whenever a file is assigned/pushed by an administrator to a group, the file risk designation 133 of the file is ascertained and mapped onto one or more of the device security posture 125. For example, an executable file which is considered at "High-Risk" is only seeded using devices which are considered "Highly Secure."

There are various ways to ascertain the file risk designation 133 of the file. For example, the management service 116 can perform an antivirus or malware scan of the file 129, generate a checksum and securely store the file 129 somewhere the client device client device 106 can verify the checksum upon download, and a common vulnerabilities and exposures feed can be consulted and a comparison of the file attributes or checksum with the feed can be performed to ascertain the risk level of the file 129.

Next, the file sharing client 147 or the management service 116 can be informed of the mapping and provided with a list of device identifiers within the grouping that meet a minimum security posture 125 according to the ascertained file risk designation 133. The file sharing client 147 can complete the file download only using the identified devices as peers, which can guarantee that the most important files which have a high risk of being tampered are transferred using only the most secure peers. Devices which do not meet the minimum security posture 125 that matches the file risk designation 133 of the file 129 being pushed are excluded from the p2p system. In these devices, the file 129 might be downloaded directly from a designated server after reconfirmation by the administrator or after a remedial action is performed by the client device 106 or user, such as a user reauthentication or a device vulnerability scan.

For example, an administrator can push the latest confidential sales report to a group. The file is assigned a High-Risk level automatically (based on type of file) or explicitly by the administrator. The management service 116 can perform a mapping of this High-Risk Level file to Highly Secure Devices in the device data 123 based upon an analysis of the respective security posture 125 of the devices in the grouping. Thus, the file 129 can be eligible for p2p file transfer only between devices with a rating of Highly Secure. Other seed peers in the Group are excluded from the p2p seeding. Also, the file 129 can be deleted from such devices by the file sharing client 147 running on the devices when the security rating dips below the required threshold.

In case of client devices that are not selected as seeders, where the security status of the device is lower than the required security status for downloading a file—the file might be directly downloaded from the server on such devices if re-confirmed by the administrator or on re-authentication by the user.

In some cases, when any file 129 is assigned by the administrator to grouping and classified with a file risk designation 133, the number of prospective peers available for seeding based upon their respective security posture 125 can be displayed to the administrator. Based on these figures, an administrator can accordingly toggle the security level of the file to increase the number of peers available distribution of the file 129.

Figure 2:
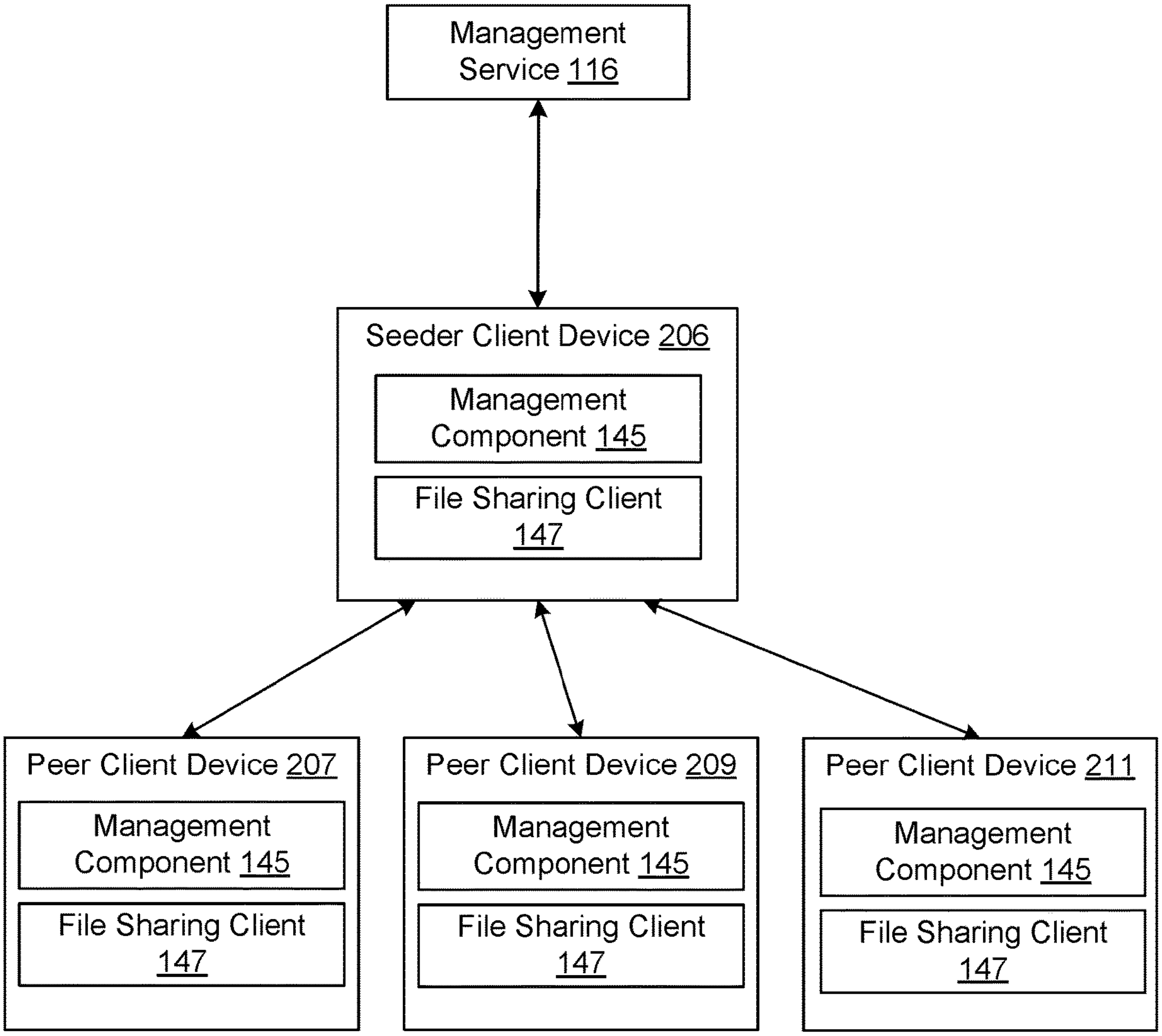
FIG. 2 is a block diagram illustrating an example scenario according to examples of the disclosure.

Reference is now made to FIG. 2, which illustrates how a file 129 can be distributed according to examples of the disclosure. In the scenario shown in FIG. 2, the management service 116 has created a grouping that includes a master seeder client device 206, and peer client devices 207, 209, and 211.

The management service 116 can designate the depicted grouping of client devices 106 as recipients of a file 129. The management service 116 can also select seeder client device 206 as the seeder of the file that can facilitate distribution of the file 129 to peer client devices 207, 209, and 211.

Accordingly, the management service 116 can periodically assess the security posture 125 of the client devices 106 in the grouping as described above. As one example, consider a scenario where the security posture 125 of the peer client device 207 drops below a threshold level for the peer client device 207 to participate as a peer in the p2p system to receive the file 129 according to the file risk designation 133 of the file 129. In this scenario, the peer client device 207 can be excluded from the p2p system. Accordingly, as other client devices 106, such as client device 209 and 211, maintain a security posture 125 at an acceptable level to receive the file 129, these devices can remain in the p2p system.

Figure 3:
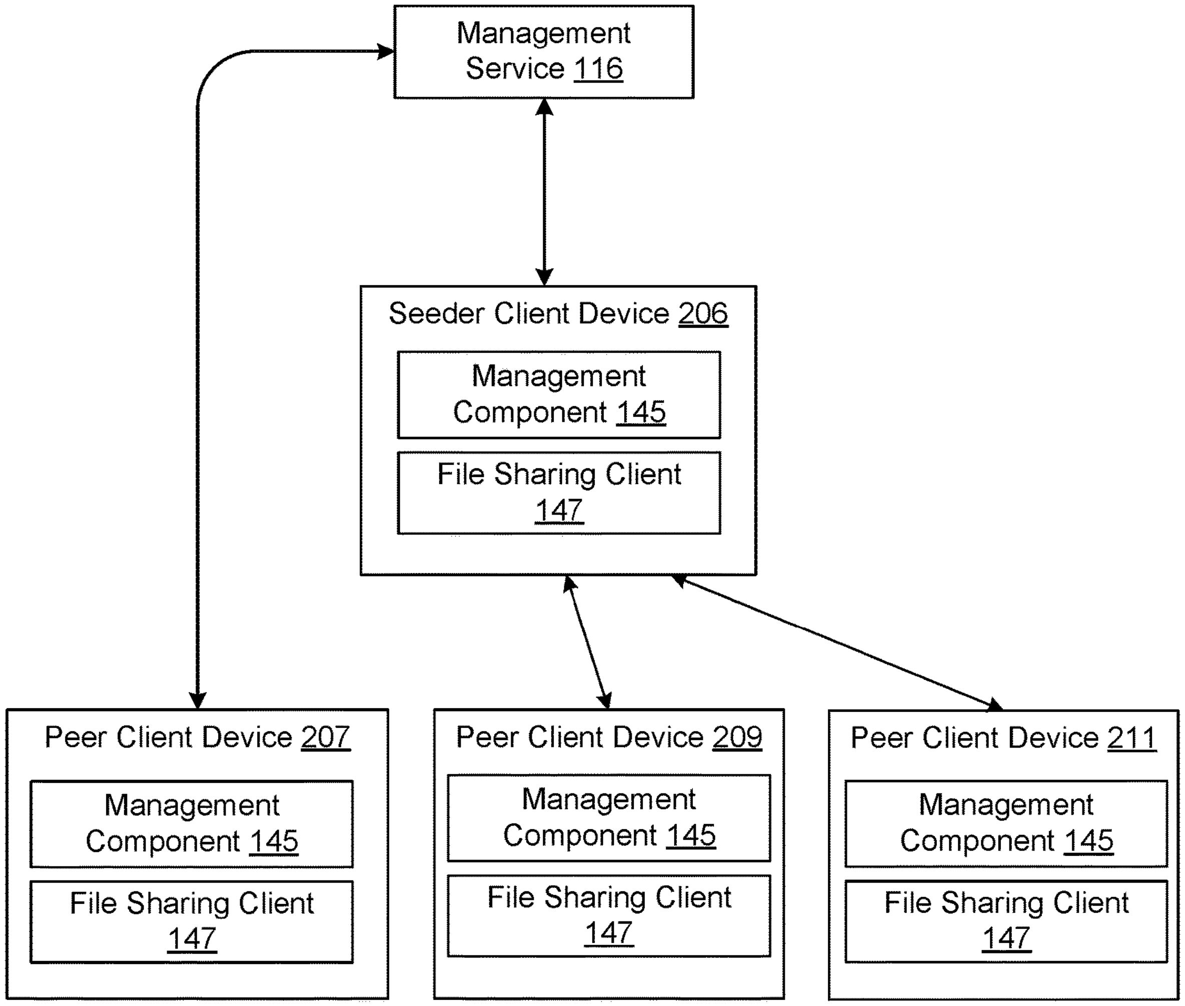
FIG. 3 is a block diagram illustrating an example scenario according to examples of the disclosure.

Therefore, continuing the example of FIG. 2, reference is now made to FIG. 3. In the scenario shown in FIG. 2, the peer client device 207 was determined to have a security posture 125 that dropped below an acceptable level. The peer client device 207 can be excluded from the p2p system and required to receive the file directly from the management service 116 or another server. In some examples, the file sharing client 147 may prompt the user of the peer client device 207 for additional authentication or require other security measures to obtain the file 129 onto the peer client device 207.

Figure 4:
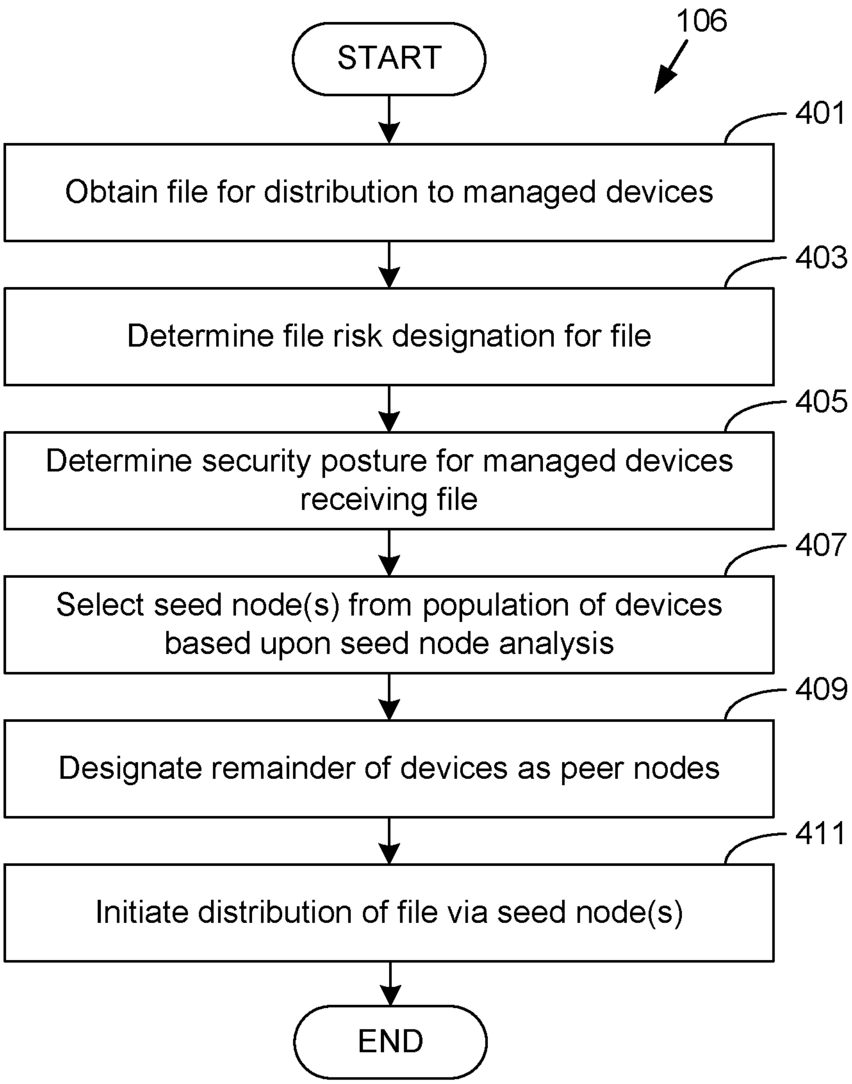
FIG. 4 is a flowchart that illustrates an example method according to examples of the disclosure.

Reference is made to FIG. 4, which is a flowchart that illustrates an example method of how the management service 116 can facilitate distribution of a file 129 to a grouping of client devices 106 according to examples of the disclosure.

Beginning at step 501, the management service 116 executing in the computing environment 102 can obtain a file 129 for distribution to a population of client devices 106 that are managed by the management service 116. The file 129 can be provided to the management service 116 via a user interface that an administrator can utilize to upload or provide a reference to the file 129. Additionally, the administrator can select a grouping of client devices 106 to receive the file 129. The grouping of devices can also be selected via a user interface that can allow the administrator to individually select devices based upon a user associated with the device or by selecting a grouping of devices or users from a directory utilized by the enterprise, such as Microsoft Active Directory®.

At step 403, the management service 116 can determine a file risk designation 133 for the file 129. The file risk designation 133 can be manually specified by the administrator or determined based upon the file type 131 or an analysis of the contents of the file. For example, a keyword or sentiment analysis can be performed on a document to determine the sensitivity of the information contained in the file 129. As another example, the file type 131 can be automatically analyzed. Executable or installable files 129 can be designated as higher risk than documents or passive forms of content that are not installable or executable on a client device 106. As another example, in the case of an installable or executable file 129, the device permissions requested by the file 129 can also be factored into the analysis. An application that requires camera, location, file-system, or other permissions can be deemed higher risk than another application that requires no device permissions.

At step 405, the management service 116 can determine a security posture 125 of the devices that are slated to receive the file 129. The management service 116 can determine the security posture 125 based upon device information provided by a management component 145 running on the respective devices.

At step 407, the management service 116 can select a seeder node, or potentially multiple seeder nodes, for distribution of the file. The seeder nodes can be selected based upon bandwidth availability of the devices, CPU utilization, a quality of network connection to the management service 116, and other considerations utilized by a p2p system. Additionally, the seeders can be selected based upon a security posture 125 and whether the devices meet a minimum security posture 125 according to the file risk designation 133 determined at step 403.

At step 409, the management service 116 can designate a remainder of the devices that are not selected as seeders to be peer devices in the p2p system. At step 411, the management service 116 can initiate distribution of the file to the seeders and peers according to a p2p file distribution or file sharing protocol. Thereafter, the process can proceed to completion.

Figure 5:
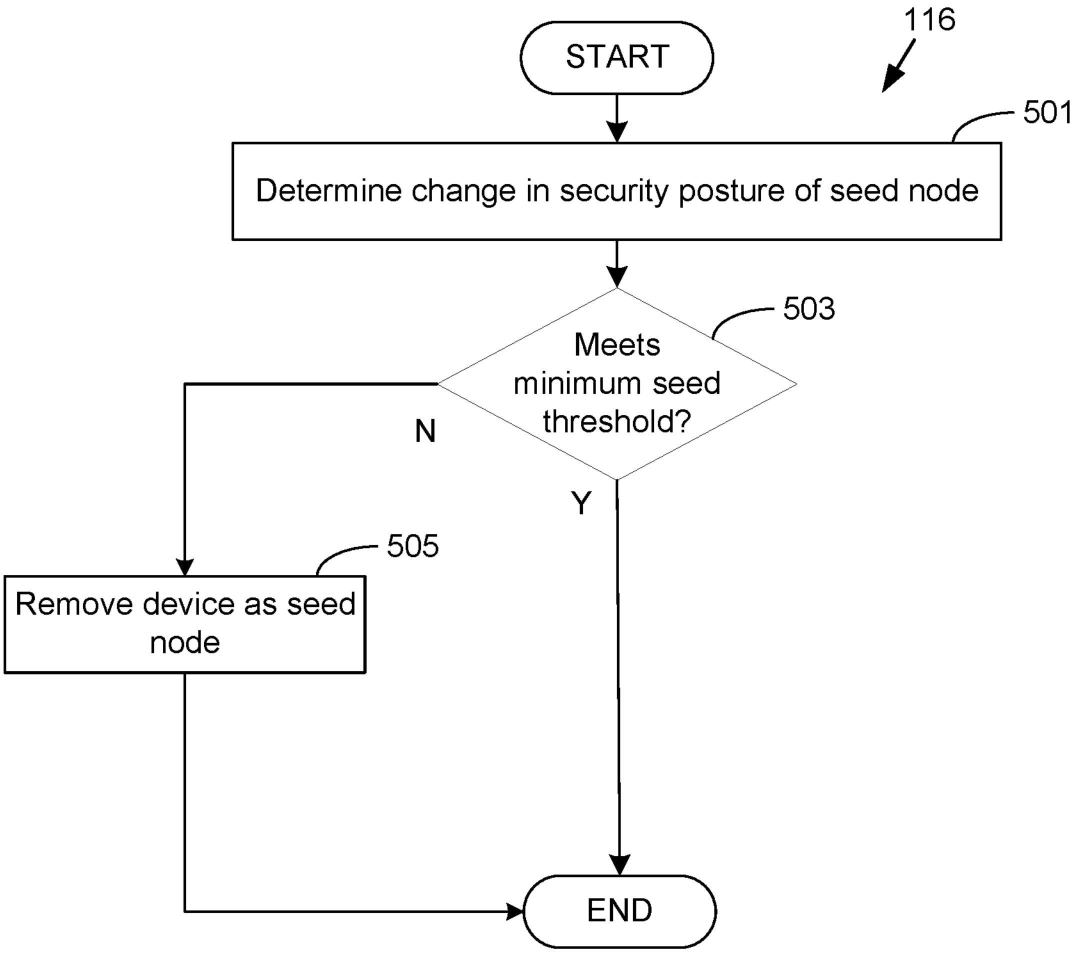
FIG. 5 is a flowchart that illustrates an example method according to examples of the disclosure.

Referring next to FIG. 5, shown is a flowchart that provides an example of how the management service 116 can remove a client device 106 as a seeder from the p2p system. The flowchart of FIG. 5 assumes that a file 129 is being distributed by the management service 116 to a population of devices using a p2p system. At step 501, the management service 116 can determine a change in the security posture 125 of a client device 106 that has been selected as a seeder in the p2p distribution of a file 129. The security posture 125 change can result in a change in device conditions of the client device 106, such a network connection, location, installed applications, O/S version, device settings, device permissions granted to installed application, or any other change in the configuration or location of the device.

At step 503, the management service 116 can determine whether the updated security posture 125 of the device meets a minimum threshold file risk designation 133 corresponding to the file 129. If the security posture 125 meets the minimum threshold file risk designation 133, meaning the security posture 125 is an acceptable level to continue acting as a seeder for the file 129, the process can proceed to completion because the client device 106 can continue acting as a seeder.

If the updated security posture 125 fails to meet a minimum threshold that allows the client device 106 to ace as a seeder for the file 129, the management service 116 can remove the client device 106 as a seeder for the file 129. The management service 116 can remove the client device 106 as a seeder by instructing the file sharing client 147 running on the client device 106 and/or other peer and seeder nodes to cease communication with the client device 106 as a node in the p2p system for distributing the file 129. The management service 116 can also instruct the file sharing client 147 to delete any portion of the file 129 downloaded onto the client device 106 and communicate with the management service 116 or another file server directly to obtain the file 129. In some implementations, the management service 116 can require a remedial action, such as correction of a condition affecting the security posture 125 of the client device 106 as well as user authentication to obtain the file 129 onto the client device 106. Thereafter, the process can proceed to completion.

Figure 6:
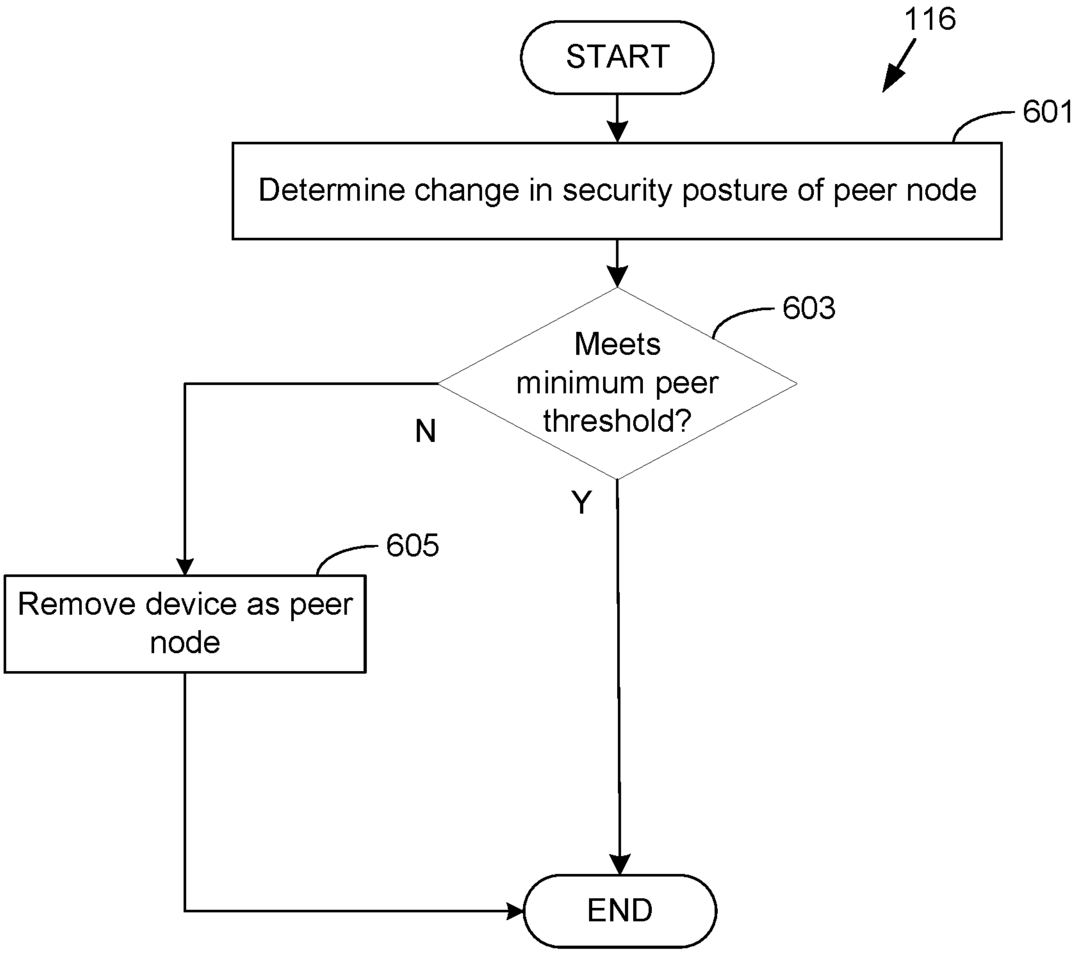
FIG. 6 is a flowchart that illustrates an example method according to examples of the disclosure.

Referring next to FIG. 6, shown is a flowchart that provides an example of how the management service 116 can remove a client device 106 as a peer from the p2p system. The flowchart of FIG. 6 assumes that a file 129 is being distributed by the management service 116 to a population of devices using a p2p system. At step 601, the management service 116 can determine a change in the security posture 125 of a client device 106 that has been selected as a peer in the p2p distribution of a file 129. The security posture 125 change can result in a change in device conditions of the client device 106, such a network connection, location, installed applications, O/S version, device settings, device permissions granted to installed application, or any other change in the configuration or location of the device.

At step 603, the management service 116 can determine whether the updated security posture 125 of the device meets a minimum threshold file risk designation 133 corresponding to the file 129. If the security posture 125 meets the minimum threshold file risk designation 133, meaning the security posture 125 is an acceptable level to continue acting as a peer for the file 129, the process can proceed to completion because the client device 106 can continue acting as a peer.

If the updated security posture 125 fails to meet a minimum threshold that allows the client device 106 to ace as a peer for the file 129, the management service 116 can remove the client device 106 as a peer for the file 129. The management service 116 can remove the client device 106 as a peer by instructing the file sharing client 147 running on the client device 106 and/or other peer and seeder nodes to cease communication with the client device 106 as a node in the p2p system for distributing the file 129. The management service 116 can also instruct the file sharing client 147 to delete any portion of the file 129 downloaded onto the client device 106 and communicate with the management service 116 or another file server directly to obtain the file 129. In some implementations, the management service 116 can require a remedial action, such as correction of a condition affecting the security posture 125 of the client device 106 as well as user authentication to obtain the file 129 onto the client device 106. Thereafter, the process can proceed to completion.

The flowcharts of FIGS. 4-6 show examples of the functionality and operation of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

Although the flowchart and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The various components described herein can include at least one processing circuit, where such a processing circuit can include, for example, one or more processors and one or more storage devices that are coupled to a local interface. The local interface can include, for example, a data bus with an accompanying address/control bus or any other suitable bus structure.

The various components described herein can be embodied in the form of hardware, as software components that are executable by hardware, or as a combination of software and hardware. If embodied as hardware, the components described herein can be implemented as a circuit or state machine that employs any suitable hardware technology.

One or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

The above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

The invention claimed is:

1. A method comprising:

obtaining a file for a peer-to-peer distribution to a population of devices that are managed by a management service;

determining a file risk designation for the file;

determining, via the management service, a respective security posture of the population of devices based upon an analysis of a set of device conditions associated with respective ones of the population of devices;

mapping the file risk designation to a minimum required security posture for participation in the peer-to-peer distribution of the file;

selecting at least one seed node from the population of devices based upon the minimum required security posture corresponding to the file risk designation and a comparison of the respective security posture of each device to the minimum required security posture;

selecting a remainder of the population of devices having respective security postures satisfying the minimum required security posture as peer nodes;

initiating distribution of the file to the at least one seed node, wherein the at least one seed node facilitates further distribution of the file to the peer nodes meeting the minimum required security posture based upon the file risk designation;

continually reevaluating, during the distribution of the file, the security posture of the selected at least one seed node by the management service;

determining, by the management service, that the security posture of the selected at least one seed node has changed such that the security posture no longer satisfies the minimum required security posture corresponding to the file risk designation; and transmitting, by the management service, an instruction to the at least one seed node to cease distribution of the file to the peer nodes.

2. The method of claim 1, wherein determining the file risk designation for the file comprises obtaining, via a management user interface, a risk designation from an administrator of the management service.

3. The method of claim 1, wherein determining the file risk designation for the file is based upon an automatic determination from an analysis of a file type of the file or a content of the file.

4. The method of claim 1, wherein the file risk designation comprises a highest risk designation from a plurality of designations and selecting the at least one seed node comprises selecting only a highly secure device from the population of devices in response to the highest risk designation.

5. The method of claim 1, wherein the peer nodes facilitate distribution of the file to other peer nodes that also meet the minimum required security posture.

6. The method of claim 1, wherein transmitting the instruction to the at least one seed node to cease distribution of the file further comprises instructing the at least one seed node to delete at least a portion of the file stored on the at least one seed node.

7. A system comprising:

at least one computing device; and at least one application executed by the at least one computing device, the at least one application causing the at least one computing device to at least:

obtain a file for distribution to a population of devices that are managed by a management service;

determine a file risk designation for the file;

determine, via the management service, a respective security posture of the population of devices based upon an analysis of a set of device conditions associated with respective ones of the population of devices;

map the file risk designation to a minimum required security posture for participation in the peer-to-peer distribution of the file;

select at least one seed node from the population of devices based upon the minimum required security posture corresponding to the file risk designation and a comparison of the respective security posture of each device to the minimum required security posture;

select a remainder of the population of devices having respective security postures satisfying the minimum required security posture as peer nodes;

initiate distribution of the file to the at least one seed node, wherein the at least one seed node facilitates further distribution of the file to the peer nodes meeting the minimum required security posture based upon the file risk designation;

continually reevaluate, during the distribution of the file, the security posture of the selected at least one seed node by the management service;

determine, by the management service, that the security posture of the selected at least one seed node has changed such that the security posture no longer satisfies the minimum required security posture corresponding to the file risk designation; and transmit, by the management service, an instruction to the at least one seed node to cease distribution of the file to the peer nodes.

8. The system of claim 7, wherein determining the file risk designation for the file comprises obtaining, via a management user interface, a risk designation from an administrator of the management service.

9. The system of claim 7, wherein determining the file risk designation for the file is based upon an automatic determination from an analysis of a file type of the file or a content of the file.

10. The system of claim 7, wherein the file risk designation comprises a highest risk designation from a plurality of designations and selecting the at least one seed node comprises selecting only a highly secure device from the population of devices in response to the highest risk designation.

11. The system of claim 7, wherein the peer nodes facilitate distribution of the file to other peer nodes that also meet the minimum required security posture.

12. The system of claim 7, wherein transmitting the instruction to the at least one seed node to cease distribution of the file further comprises instructing the at least one seed node to delete at least a portion of the file stored on the at least one seed node.

13. A non-transitory computer-readable medium storing a plurality of computer instructions executable by a computing device, wherein the plurality of computer instructions cause the computing device to at least:

obtain a file for peer-to-peer distribution to a population of devices that are managed by a management service;

determine a file risk designation for the file;

determine, via the management service, a respective security posture of the population of devices based upon an analysis of a set of device conditions associated with respective ones of the population of devices;

map the file risk designation to a minimum required security posture for participation in the peer-to-peer distribution of the file;

select at least one seed node from the population of devices based upon the minimum required security posture corresponding to the file risk designation and a comparison of the respective security posture of each device to the minimum required security posture;

select a remainder of the population of devices having respective security postures satisfying the minimum required security posture as peer nodes;

initiate distribution of the file to the at least one seed node, wherein the at least one seed node facilitates further distribution of the file to the peer nodes meeting the minimum required security posture based upon the file risk designation;

continually reevaluate, during the distribution of the file, the security posture of the selected at least one seed node by the management service;

determine, by the management service, that the security posture of the selected at least one seed node has changed such that the security posture no longer satisfies the minimum required security posture corresponding to the file risk designation; and transmit, by the management service, an instruction to the at least one seed node to cease distribution of the file to the peer nodes.

14. The non-transitory computer-readable medium of claim 13, wherein determining the file risk designation for the file comprises obtaining, via a management user interface, a risk designation from an administrator of the management service.

15. The non-transitory computer-readable medium of claim 13, wherein determining the file risk designation for the file is based upon an automatic determination from an analysis of a file type of the file or a content of the file.

16. The non-transitory computer-readable medium of claim 13, wherein the file risk designation comprises a highest risk designation from a plurality of designations and selecting the at least one seed node comprises selecting only a highly secure device from the population of devices in response to the highest risk designation.

17. The non-transitory computer-readable medium of claim 13, wherein the peer nodes facilitate distribution of the file to other peer nodes that also meet the minimum required security posture.

18. The non-transitory computer-readable medium of claim 13, wherein transmitting the instruction to the at least one seed node to cease distribution of the file further comprises instructing the at least one seed node to delete at least a portion of the file stored on the at least one seed node.

* * * * *